US 12,447,554 B2

(12) United States Patent
Ryu

(10) Patent No.: US 12,447,554 B2
(45) Date of Patent: Oct. 21, 2025

(54) LASER PROCESSING APPARATUS

(71) Applicant: DISCO CORPORATION, Tokyo (JP)

(72) Inventor: Jonghyun Ryu, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 709 days.

(21) Appl. No.: 17/812,585

(22) Filed: Jul. 14, 2022

(65) Prior Publication Data
US 2023/0022951 A1   Jan. 26, 2023

(30) Foreign Application Priority Data

Jul. 21, 2021   (JP) .................................. 2021-120645

(51) Int. Cl.
*B23K 26/06*   (2014.01)
*B23K 26/70*   (2014.01)

(52) U.S. Cl.
CPC ........ *B23K 26/0648* (2013.01); *B23K 26/702* (2015.10)

(58) Field of Classification Search
CPC .... B23K 26/16; B23K 26/364; B23K 26/648; B23K 26/702
See application file for complete search history.

(56) References Cited

U.S. PATENT DOCUMENTS

| 3,578,839 A * | 5/1971 | Riggle | B23K 26/12 219/121.75 |
| 2013/0273749 A1 | 10/2013 | Mizumura et al. | |
| 2024/0238906 A1 * | 7/2024 | Yamaguchi | B23K 26/38 |

FOREIGN PATENT DOCUMENTS

| DE | 144013 A1 | 9/1980 |
| DE | 102011087181 A1 | 5/2013 |
| JP | 07100670 A | 4/1995 |
| JP | 10328878 A | 12/1998 |
| JP | 2002035985 A * | 2/2002 |
| JP | 2006319198 A | 11/2006 |
| JP | 2016040108 A | 3/2016 |
| WO | 2013079450 A1 | 6/2013 |

OTHER PUBLICATIONS

Office Action issued in counterpart Japanese patent application No. 2021-120645, dated Mar. 11, 2025.
Office Action issued in counterpart German patent application No. 10 2022 207 199.9, dated Mar. 7, 2025.
Office Action issued in counterpart Japanese patent application No. 2021-120645, dated Oct. 22, 2024.

* cited by examiner

*Primary Examiner* — Woody A Lee, Jr.
(74) *Attorney, Agent, or Firm* — GREER BURNS & CRAIN, LTD.

(57) ABSTRACT

There is provided a laser processing apparatus that processes a workpiece by irradiation with a laser beam. The laser processing apparatus includes a holding unit including a holding surface that holds the workpiece and a laser irradiation unit that irradiates the workpiece held by the holding unit with the laser beam. The laser irradiation unit includes a laser oscillator, a collecting lens that focuses the laser beam emitted from the laser oscillator, and a foreign matter adhesion preventing unit that prevents adhesion of a foreign matter to the collecting lens.

9 Claims, 4 Drawing Sheets

LASER PROCESSING APPARATUS

BACKGROUND OF THE INVENTION

Field of the Invention

The present invention relates to a laser processing apparatus that processes a workpiece by irradiation with a laser beam.

Description of the Related Art

In a manufacturing process of device chips, a wafer in which a device is formed in each of multiple regions marked out by multiple streets (planned dividing lines) arranged in a lattice manner is used. Multiple device chips each including the device are obtained by dividing the wafer along the streets. The device chips are incorporated into various electronic appliances such as mobile phones and personal computers.

A cutting apparatus that cuts a workpiece by an annular cutting blade is used for the dividing of the wafer. Meanwhile, in recent years, development of a process of dividing a wafer by laser processing using a laser processing apparatus has also been advanced. The laser processing apparatus includes a holding unit (chuck table) that holds a workpiece and a laser irradiation unit that irradiates the workpiece with a laser beam. Laser processing is executed for a wafer by holding the wafer by the holding unit and irradiating the wafer with the laser beam from the laser irradiation unit. For example, in Japanese Patent Laid-open No. 2006-319198, a processing method in which laser-processed grooves are formed in a wafer along streets by irradiation with a laser beam is disclosed. When an external force is given to the wafer in which the laser-processed grooves are formed along the streets, the laser-processed grooves function as the origin of dividing, and the wafer is divided along the streets.

SUMMARY OF THE INVENTION

The laser irradiation unit mounted in the laser processing apparatus includes a collecting lens that focuses the laser beam on a predetermined position. Further, when a workpiece is processed by the laser processing apparatus, the collecting lens is positioned to face the workpiece, and, for example, irradiation is executed in such a manner that the laser beam is focused on the surface or the inside of the workpiece. Here, for example, when ablation processing is executed for the workpiece by the irradiation with the laser beam, molten substances of the workpiece become debris (processing dust) and are scattered. Moreover, in some cases, a minute amount of particles or mist floats in a processing chamber in which processing of the workpiece is executed. If such a foreign matter adheres to the collecting lens, there is a fear that the workpiece is not irradiated with the laser beam under the intended condition and processing failure occurs. Thus, when a foreign matter adheres to the collecting lens, cleaning or replacement of the collecting lens is executed.

However, when the cleaning or replacement of the collecting lens is executed, careful handling of the collecting lens is required to prevent characteristics of the collecting lens from being affected by a scratch or the like. Further, when the collecting lens is mounted on the laser irradiation unit, the position and the orientation of the collecting lens need to be strictly adjusted to allow the laser beam to be focused on a desired position. Thus, trouble is taken for attachment and detachment of the collecting lens, which becomes a cause of lowering of the operating efficiency of the laser processing apparatus.

A cover that covers the side of the surface that faces a workpiece in the collecting lens is mounted on the laser irradiation unit in some cases. The cover is formed of glass or the like having transmissibility with respect to the laser beam, and the laser beam that has passed through the collecting lens is transmitted through the cover to be applied to the workpiece. By the cover, adhesion of a foreign matter to the collecting lens is prevented, and the frequency of the cleaning or replacement of the collecting lens is reduced. When a predetermined amount or more of foreign matters adheres to the cover, cleaning or replacement of the cover is executed so as not to adversely affect laser processing. However, the cover is inexpensive, and attachment and detachment thereof are also easy compared with the collecting lens, so that excessive trouble and cost are not taken for the cleaning or replacement of the cover. However, as long as the cleaning or replacement of the cover is periodically executed, suspension of processing of a workpiece by the laser processing apparatus is inevitable, and there is a limit on the operating efficiency of the laser processing apparatus.

The present invention is made in view of such a problem and intends to provide a laser processing apparatus with high operating efficiency.

In accordance with an aspect of the present invention, there is provided a laser processing apparatus that processes a workpiece by irradiation with a laser beam. The laser processing apparatus includes a holding unit including a holding surface that holds the workpiece and a laser irradiation unit that irradiates the workpiece held by the holding unit with the laser beam. The laser irradiation unit includes a laser oscillator, a collecting lens that focuses the laser beam emitted from the laser oscillator, and a foreign matter adhesion preventing unit that prevents adhesion of a foreign matter to the collecting lens. The foreign matter adhesion preventing unit includes a protective film that is disposed between the holding surface and the collecting lens and has transmissibility with respect to the laser beam, a first roller to which one end side of the protective film is fixed and that rotates to thereby send out the protective film, and a second roller to which the other end side of the protective film is fixed and that rotates to thereby take up the protective film.

The collecting lens may be disposed under the holding surface. Further, the protective film may be a polyolefin-based film or a polyester-based film.

On the laser irradiation unit of the laser processing apparatus according to the aspect of the present invention, the foreign matter adhesion preventing unit including the protective film disposed between the holding surface of the holding unit and the collecting lens, the first roller that sends out the protective film, and the second roller that takes up the protective film is mounted. Further, adhesion of a foreign matter to the collecting lens is prevented by the protective film. In addition, the protective film can easily be moved by the first roller and the second roller. Mounting the above-described foreign matter adhesion preventing unit on the laser irradiation unit makes it possible to easily and rapidly position the protective film to which a foreign matter is not adhered to the position that overlaps with the collecting lens. As a result, suspension of processing of the workpiece by the laser processing apparatus for a long time due to foreign matter removal work can be avoided, and the operating efficiency of the laser processing apparatus improves.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
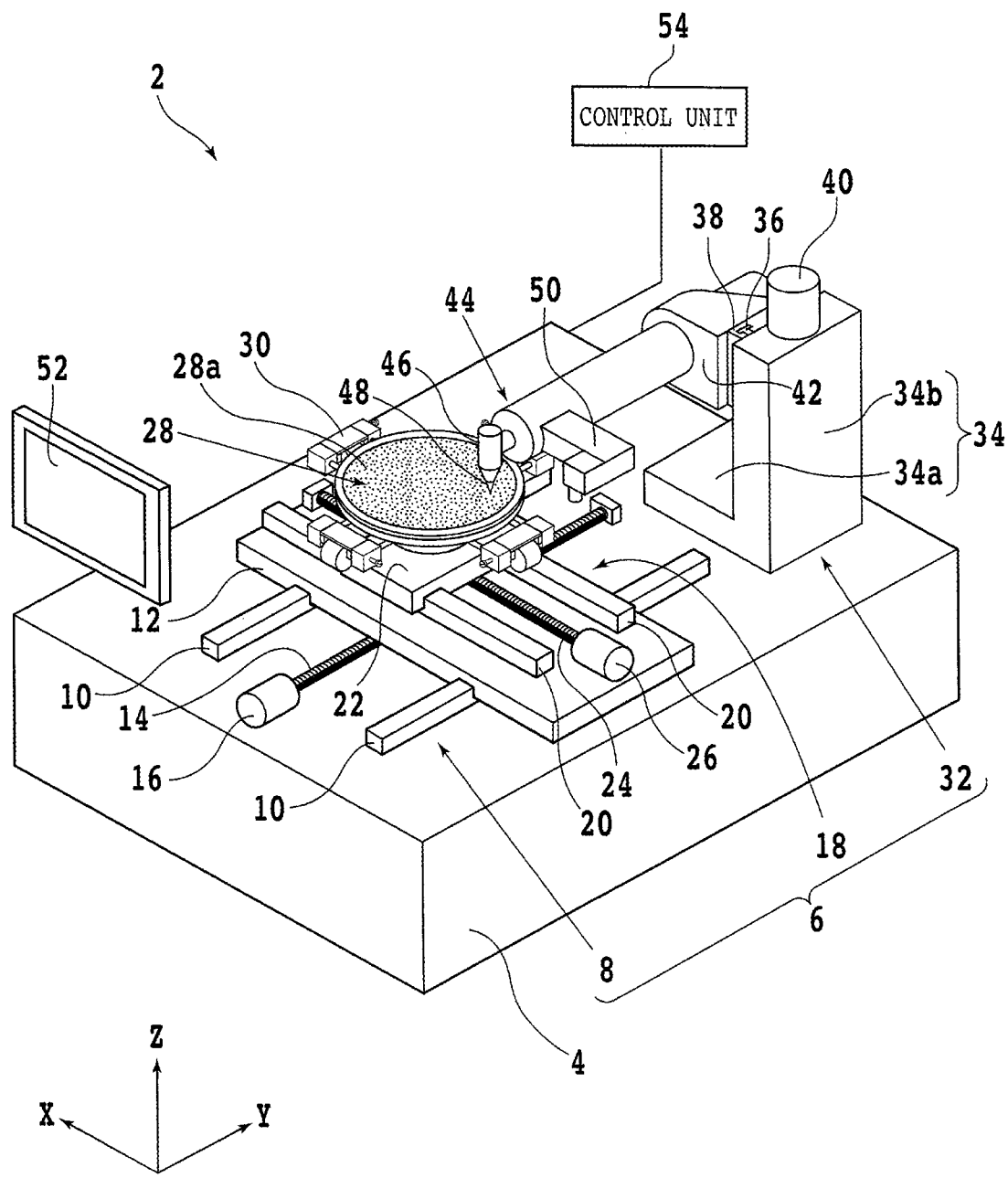
FIG. 1 is a perspective view illustrating a laser processing apparatus.

An embodiment according to one aspect of the present invention will be described below with reference to the accompanying drawings. First, a configuration example of a laser processing apparatus according to the present embodiment will be described. FIG. 1 is a perspective view illustrating a laser processing apparatus 2. In FIG. 1, an X-axis direction (processing feed direction, first horizontal direction) and a Y-axis direction (indexing feed direction, second horizontal direction) are directions perpendicular to each other. Further, a Z-axis direction (height direction, vertical direction, upward-downward direction) is the direction perpendicular to the X-axis direction and the Y-axis direction.

The laser processing apparatus 2 includes a base 4 that supports constituent elements that configure the laser processing apparatus 2. The upper surface of the base 4 is a flat surface substantially parallel to the horizontal direction (XY-plane direction), and a movement mechanism (movement unit) 6 is disposed over the upper surface of the base 4. The movement mechanism 6 includes a Y-axis movement mechanism (Y-axis movement unit) 8, an X-axis movement mechanism (X-axis movement unit) 18, and a Z-axis movement mechanism (Z-axis movement unit) 32.

The Y-axis movement mechanism 8 includes a pair of Y-axis guide rails 10 disposed along the Y-axis direction on the upper surface of the base 4. A Y-axis moving table 12 with a flat plate shape is mounted on the pair of Y-axis guide rails 10 slidably along the Y-axis guide rails 10. A nut part (not illustrated) is disposed on the side of the back surface (lower surface) of the Y-axis moving table 12. A Y-axis ball screw 14 disposed along the Y-axis direction between the pair of Y-axis guide rails 10 is screwed to this nut part. Further, a Y-axis pulse motor 16 that rotates the Y-axis ball screw 14 is coupled to an end part of the Y-axis ball screw 14. When the Y-axis ball screw 14 is rotated by the Y-axis pulse motor 16, the Y-axis moving table 12 moves in the Y-axis direction along the Y-axis guide rails 10.

The X-axis movement mechanism 18 includes a pair of X-axis guide rails 20 disposed along the X-axis direction on the side of the front surface (upper surface) of the Y-axis moving table 12. An X-axis moving table 22 with a plate shape is mounted on the pair of X-axis guide rails 20 slidably along the X-axis guide rails 20. A nut part (not illustrated) is disposed on the side of the back surface (lower surface) of the X-axis moving table 22. An X-axis ball screw 24 disposed along the X-axis direction between the pair of X-axis guide rails 20 is screwed to this nut part. Further, an X-axis pulse motor 26 that rotates the X-axis ball screw 24 is coupled to an end part of the X-axis ball screw 24. When the X-axis ball screw 24 is rotated by the X-axis pulse motor 26, the X-axis moving table 22 moves in the X-axis direction along the X-axis guide rails 20.

A holding unit (holding table, chuck table) 28 that holds a workpiece 11 (see FIG. 2) that is a target object of processing by the laser processing apparatus 2 is disposed over the front surface (upper surface) of the X-axis moving table 22. Further, multiple clamps 30 that grasp and fix an annular frame 17 (see FIG. 2) that supports the workpiece 11 are disposed around the holding unit 28. The upper surface of the holding unit 28 is a flat surface substantially parallel to the horizontal direction (XY-plane direction) and configures a holding surface 28a that holds the workpiece 11. The holding surface 28a is connected to a suction source (not illustrated) such as an ejector through a flow path (not illustrated) formed inside the holding unit 28, a valve (not illustrated), and so forth.

When the Y-axis moving table 12 is moved along the Y-axis direction, the holding unit 28 moves along the Y-axis direction. Further, when the X-axis moving table 22 is moved along the X-axis direction, the holding unit 28 moves along the X-axis direction. Moreover, a rotational drive source (not illustrated), such as a motor, that rotates the holding unit 28 around a rotation axis substantially parallel to the Z-axis direction is coupled to the holding unit 28.

The Z-axis movement mechanism 32 is disposed at the rear end part of the base 4 (rear side of the Y-axis movement mechanism 8, the X-axis movement mechanism 18, and the holding unit 28). The Z-axis movement mechanism 32 includes a support structure 34 disposed on the upper surface of the base 4. The support structure 34 includes a base part 34a that is fixed to the base 4 and has a rectangular parallelepiped shape and a columnar support part 34b that protrudes upward from an end part of the base part 34a. The front surface (side surface) of the support part 34b is formed into a flat surface shape along the Z-axis direction.

A pair of Z-axis guide rails 36 are disposed along the Z-axis direction on the front surface of the support part 34b. A Z-axis moving plate 38 with a flat plate shape is mounted on the pair of Z-axis guide rails 36 slidably along the Z-axis guide rails 36. A nut part (not illustrated) is disposed on the back surface side of the Z-axis moving plate 38. A Z-axis ball screw (not illustrated) disposed along the Z-axis direction between the pair of Z-axis guide rails 36 is screwed to this nut part. Further, a Z-axis pulse motor 40 that rotates the Z-axis ball screw is coupled to an end part of the Z-axis ball screw. Moreover, a support member 42 is fixed to the front surface side of the Z-axis moving plate 38. When the Z-axis ball screw is rotated by the Z-axis pulse motor 40, the Z-axis moving plate 38 and the support member 42 move in the Z-axis direction along the Z-axis guide rails 36.

The support member 42 supports a laser irradiation unit 44. The laser irradiation unit 44 includes a laser processing head 46 and irradiates the workpiece 11 (see FIG. 2) held by the holding unit 28 with a laser beam 48 from the laser processing head 46. As a result, laser processing is executed for the workpiece 11. Further, an imaging unit 50 that can image the workpiece 11 or the like held by the holding unit 28 is mounted on the laser irradiation unit 44. The imaging unit 50 includes a visible light camera including an imaging element that receives visible light and converts the visible light to an electrical signal, an infrared camera including an imaging element that receives infrared and converts the infrared to an electrical signal, and so forth. An image acquired through imaging of the workpiece 11 by the imaging unit 50 is used for, for example, position adjustment between the holding unit 28 and the laser processing head 46. When the Z-axis moving plate 38 is moved along the Z-axis direction, the laser processing head 46 and the imaging unit 50 move (rise and lower) along the Z-axis direction. As a result, adjustment of the focal position of the laser beam 48 or focusing of the imaging unit 50 is executed.

The movement mechanism 6 is configured by the Y-axis movement mechanism 8, the X-axis movement mechanism 18, and the Z-axis movement mechanism 32. The movement mechanism 6 relatively moves the holding unit 28, the laser beam 48 emitted from the laser processing head 46, and the imaging unit 50 along the processing feed direction (X-axis direction) and the indexing feed direction (Y-axis direction).

Further, the laser processing apparatus 2 includes a display unit (display part, display device) 52 that displays various kinds of information relating to the laser processing apparatus 2. For example, a touch panel is used as the display unit 52 and an operation screen for operating the laser processing apparatus 2 is displayed on the touch panel. An operator of the laser processing apparatus 2 can input information to the laser processing apparatus 2 by touch operation of the touch panel. That is, the touch panel functions also as an input unit (input part, input device) for inputting various kinds of information to the laser processing apparatus 2 and is used as a user interface. However, the input unit may be a mouse, a keyboard, and so forth disposed independently of the display unit 52 separately.

Moreover, the laser processing apparatus 2 includes a control unit (control part, control device) 54 that controls the laser processing apparatus 2. The control unit 54 is connected to each of the constituent elements that configure the laser processing apparatus 2 (movement mechanism 6, holding unit 28, clamps 30, laser irradiation unit 44, imaging unit 50, display unit 52, and so forth). The control unit 54 operates the laser processing apparatus 2 by outputting a control signal to each of the constituent elements of the laser processing apparatus 2. For example, the control unit 54 is configured by a computer. Specifically, the control unit 54 includes a calculating section that executes various kinds of calculation necessary for operation of the laser processing apparatus 2 and a storing section that stores various kinds of information (data, program, and so forth) used for the operation of the laser processing apparatus 2. The calculating section includes a processor such as a central processing unit (CPU). Further, the storing section includes a memory such as a read only memory (ROM) and a random access memory (RAM).

Figure 2:
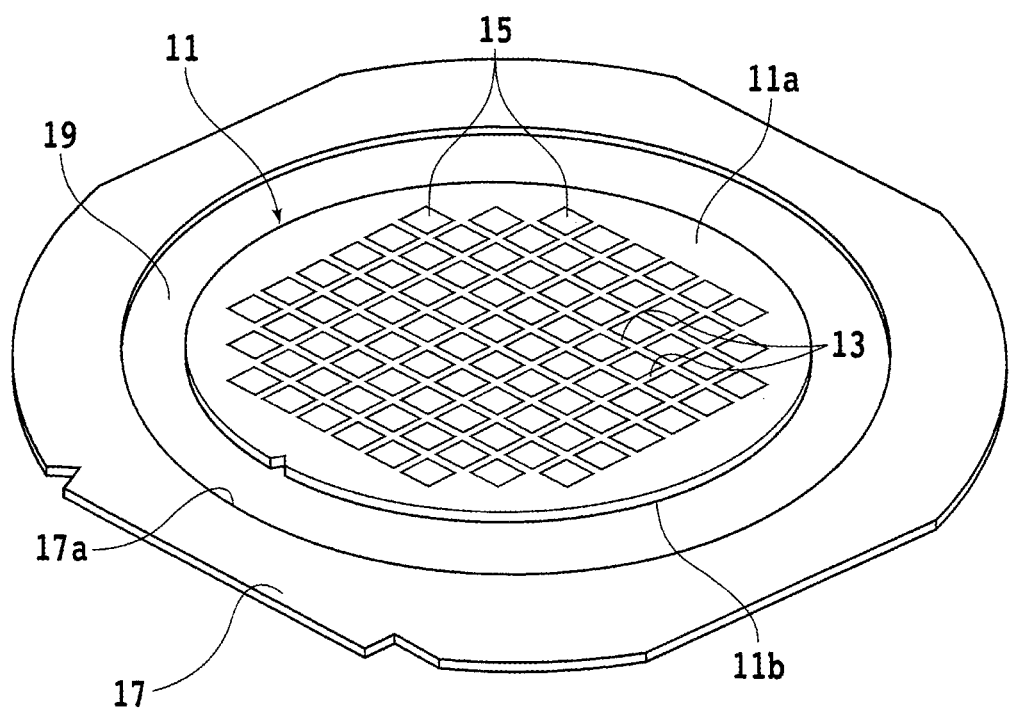
FIG. 2 is a perspective view illustrating a workpiece.

Laser processing is executed for the workpiece 11 by the laser processing apparatus 2. FIG. 2 is a perspective view illustrating the workpiece 11. For example, the workpiece 11 is a wafer that is composed of a semiconductor material such as single-crystal silicon and has a circular disc shape, and includes a front surface 11a and a back surface 11b substantially parallel to each other. The workpiece 11 is segmented into multiple rectangular regions by multiple streets (planned dividing lines) 13 arranged in a lattice manner to intersect each other. A device 15 such as an integrated circuit (IC), large scale integration (LSI), light emitting diode (LED), or micro electro mechanical systems (MEMS) device is formed on the side of the front surface 11a in each of the multiple regions marked out by the streets 13. Multiple device chips each including the device 15 are obtained by dividing the workpiece 11 along the streets 13. However, there is no limit on the kind, the material, the shape, the structure, the size, and so forth of the workpiece 11. For example, the workpiece 11 may be a wafer that is composed of a semiconductor other than silicon (gallium arsenide (GaAs), indium phosphide (InP), gallium nitride (GaN), silicon carbide (SiC), or the like), sapphire, glass, ceramic, resin, metal, or the like and has any shape and size. Further, there is no limit also on the kind, the quantity, the shape, the structure, the size, the arrangement, and so forth of the devices 15, and the devices 15 do not have to be formed in the workpiece 11.

When the workpiece 11 is processed by the laser processing apparatus 2, the workpiece 11 is supported by the annular frame 17 for convenience of handling (conveyance, holding, and so forth) of the workpiece 11. The frame 17 is composed of a metal such as stainless steel (SUS), and a circular opening 17a that penetrates the frame 17 in the thickness direction is made at the central part of the frame 17. The diameter of the opening 17a is larger than that of the workpiece 11. A circular tape 19 is stuck to the workpiece 11 and the frame 17. For example, the tape 19 includes a film-shaped base formed into a circular shape and an adhesive layer (glue layer) disposed on the base. The base is composed of resin such as PO, polyvinyl chloride, or polyethylene terephthalate. Further, the adhesive layer is composed of an epoxy-based, acrylic-based, or rubber-based adhesive or the like. An ultraviolet-curable resin that cures by irradiation with ultraviolet may be used for the adhesive layer. When the central part of the tape 19 is stuck to the side of the back surface 11b of the workpiece 11 and the outer circumferential part of the tape 19 is stuck to the frame 17 in the state in which the workpiece 11 is disposed inside the opening 17a of the frame 17, the workpiece 11 is supported by the frame 17 through the tape 19.

Figure 3:
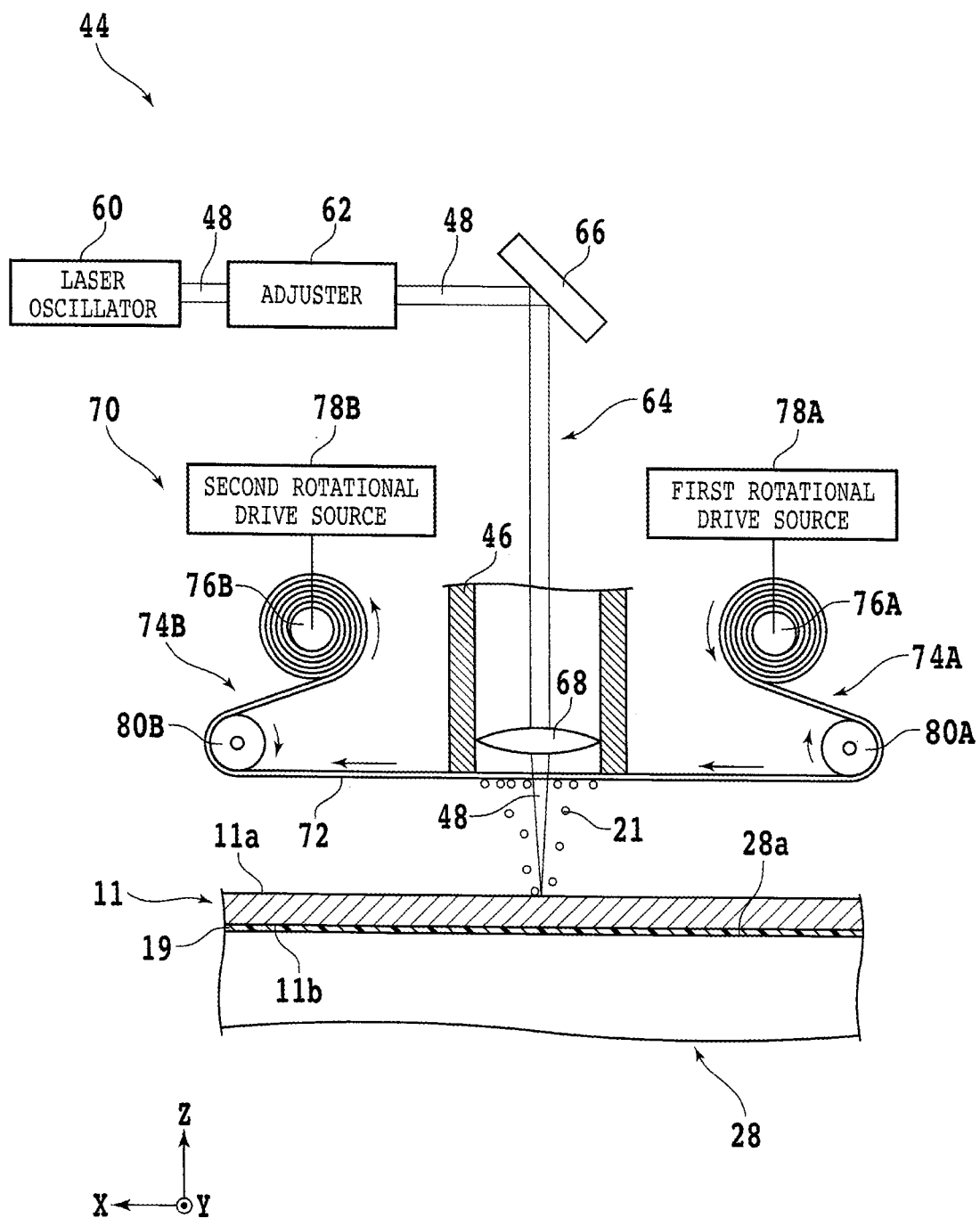
FIG. 3 is a partially sectional front view illustrating a holding unit (holding table) and a laser irradiation unit.

Next, the laser irradiation unit 44 mounted in the laser processing apparatus 2 will be described. FIG. 3 is a partially sectional front view illustrating the holding unit 28 and the laser irradiation unit 44.

When the workpiece 11 is processed by the laser processing apparatus 2, the workpiece 11 is held by the holding unit 28. For example, in the case of executing laser processing for the side of the front surface 11a of the workpiece 11, the workpiece 11 is disposed over the holding unit 28 in such a manner that the side of the front surface 11a is exposed upward and the side of the back surface 11b (side of the tape 19) faces the holding surface 28a. Further, the frame 17 is fixed by the multiple clamps 30 (see FIG. 1). When a suction force (negative pressure) of the suction source is caused to act on the holding surface 28a in this state, the workpiece 11 is held under suction by the holding unit 28 with the interposition of the tape 19.

The laser irradiation unit 44 includes a laser oscillator 60 of an yttrium aluminum garnet (YAG) laser, an yttrium orthovanadate ($YVO_4$) laser, or the like and an adjuster 62, such as an attenuator, that adjusts power of the laser beam 48 emitted from the laser oscillator 60. Further, the laser irradiation unit 44 includes an optical system 64 that guides the laser beam 48 to the workpiece 11 held by the holding unit 28. The optical system 64 includes multiple optical elements and controls the traveling direction, the shape, and so forth of the laser beam 48. Specifically, the optical system 64 includes a mirror 66 that reflects the laser beam 48 and a collecting lens 68 that focuses the laser beam 48. The collecting lens 68 is held inside the laser processing head 46, and the lower surface side of the collecting lens 68 faces the holding surface 28a of the holding unit 28.

The laser beam 48 that is emitted from the laser oscillator 60 and has power adjusted by the adjuster 62 reflects at the mirror 66 and is incident on the collecting lens 68 to be focused on a predetermined position by the collecting lens 68. For example, the laser beam 48 is focused on the front surface 11a or the inside of the workpiece 11 and executes laser processing for the workpiece 11. An irradiation condition of the laser beam 48 is set according to the contents of the laser processing executed for the workpiece 11. For example, in the case of executing ablation processing for the workpiece 11, the wavelength of the laser beam 48 is set to cause at least part of the laser beam 48 to be absorbed by the workpiece 11. That is, a laser beam having absorbability with respect to the workpiece 11 is used as the laser beam 48. Further, other irradiation conditions of the laser beam 48 (average output power, repetition frequency, processing feed rate, and so forth) are also set as appropriate to cause the ablation processing to be executed for the workpiece 11. For example, when the workpiece 11 is a silicon wafer and the ablation processing is executed for the silicon wafer, irradiation conditions of the laser beam 48 can be set as follows.

Wavelength: 355 nm
Average output power: 2 W
Repetition frequency: 200 kHz
Processing feed rate: 400 mm/s When the holding unit 28 is moved along the processing feed direction (X-axis direction) while the laser beam 48 is focused on the front surface 11a or the inside of the workpiece 11, the holding unit 28 and the laser beam 48 relatively move, and scanning with the laser beam 48 is executed along the processing feed direction. As a result, ablation processing is executed for the workpiece 11, and a linear laser-processed groove is formed on the side of the front surface 11a of the workpiece 11. For example, the workpiece 11 is divided along the streets 13 (see FIG. 2) by forming laser-processed grooves that reach the back surface 11b of the workpiece 11 from the front surface 11a along all streets 13. Further, it is also possible to divide the workpiece 11 along the streets 13 by forming laser-processed grooves with a depth less than the thickness of the workpiece 11 on the side of the front surface 11a of the workpiece 11 along all streets 13 and thereafter grinding the side of the back surface 11b of the workpiece 11 by a grinding abrasive stone to expose the laser-processed grooves to the back surface 11b of the workpiece 11. As a result, multiple device chips each including the device 15 are manufactured.

When the ablation processing is executed for the workpiece 11 by the irradiation with the laser beam 48, molten substances of the workpiece 11 become debris (processing dust) 21 and are scattered. Moreover, in some cases, a minute amount of particles or mist floats in a processing chamber in which processing of the workpiece 11 is executed. If such a foreign matter adheres to the collecting lens 68, there is a fear that the workpiece 11 is not irradiated with the laser beam 48 under the intended condition and processing failure occurs.

Thus, in the present embodiment, a foreign matter adhesion preventing unit 70 is mounted on the laser irradiation unit 44. The foreign matter adhesion preventing unit 70 prevents adhesion of a foreign matter such as the debris 21 to the collecting lens 68.

Specifically, the foreign matter adhesion preventing unit 70 includes a band-shaped protective film 72. The protective film 72 is disposed between the holding surface 28a of the holding unit 28 and the collecting lens 68 in the state of being stretched along the plane (XY-plane in FIG. 3) perpendicular to the traveling direction of the laser beam 48 (optical axis direction of the optical system 64). The width of the protective film 72 is larger than the diameter of the collecting lens 68. Further, the protective film 72 is positioned to overlap with the whole of the collecting lens 68 and cover the lower surface side of the laser processing head 46.

The protective film 72 has transmissibility with respect to the laser beam 48. That is, at least part of the laser beam 48 incident on the protective film 72 is transmitted through the protective film 72 and is applied to the workpiece 11. It is preferable that the transmittance of the protective film 72 with respect to the laser beam 48 be 80% or higher, and it is more preferable that the transmittance be 90% or higher. Specific material, thickness, and so forth of the protective film 72 can be selected as appropriate according to the wavelength of the laser beam 48 and so forth. For example, in the case of executing ablation processing for the workpiece 11 by the laser beam 48 with a wavelength of 355 nm, a polyolefin-based film, polyester-based film, or the like can be used as the protective film 72.

The polyolefin-based film is a film composed of a polymer synthesized with use of alkene as monomers. As examples of the polyolefin-based film, a polyethylene film, a polypropylene film, a polystyrene film, and so forth are cited. Further, it is also possible to use a film composed of a copolymer of propylene and ethylene or a film composed of an olefin-based elastomer. The polyester-based film is a film composed of a polymer synthesized with use of dicarboxylic acid (compound having two carboxyl groups) and diol (compound having two hydroxyl groups) as monomers. As examples of the polyester-based film, a polyethylene terephthalate film, a polyethylene naphthalate film, and so forth are cited. Moreover, it is also possible to use a polytrimethylene terephthalate film, a polybutylene terephthalate film, or a polybutylene naphthalate film.

On end side (right side of the plane of paper in FIG. 3) of the protective film 72 is coupled to a feed unit (feed mechanism) 74A that sends out the protective film 72. Further, the other end side (left side of the plane of paper in FIG. 3) of the protective film 72 is coupled to a take-up unit (take-up mechanism) 74B that takes up the protective film 72.

The feed unit 74A includes a first roller 76A with a circular column shape and a first rotational drive source 78A, such as a motor, coupled to the first roller 76A. For example, the first roller 76A is disposed with the length direction (height direction) thereof along the Y-axis direction. Further, the first rotational drive source 78A rotates the first roller 76A around a rotation axis substantially parallel to the length direction of the first roller 76A. The one end part of the protective film 72 is fixed to the first roller 76A, and the protective film 72 is wound around the first roller 76A. Moreover, when the first roller 76A is rotated by the first rotational drive source 78A, the protective film 72 wound around the first roller 76A is sent out from the first roller 76A.

Further, the feed unit 74A includes a first pulley 80A that supports the protective film 72 sent out from the first roller 76A and that has a circular column shape. The first pulley 80A is disposed with the length direction (height direction) thereof being substantially parallel to the length direction of the first roller 76A. Moreover, the first pulley 80A is held freely rotatably around a rotation axis substantially parallel to the length direction thereof.

The take-up unit 74B includes a second roller 76B with a circular column shape and a second rotational drive source 78B, such as a motor, coupled to the second roller 76B. For example, the second roller 76B is disposed with the length direction (height direction) thereof along the Y-axis direction. Further, the second rotational drive source 78B rotates the second roller 76B around a rotation axis substantially parallel to the length direction of the second roller 76B. The other end part of the protective film 72 is fixed to the second roller 76B, and the protective film 72 is wound around the second roller 76B. Moreover, when the second roller 76B is rotated by the second rotational drive source 78B, the protective film 72 is taken up by the second roller 76B.

Further, the take-up unit 74B includes a second pulley 80B that supports the protective film 72 to be taken up by the second roller 76B and that has a circular column shape. The second pulley 80B is disposed with the length direction (height direction) thereof being substantially parallel to the length direction of the second roller 76B. Moreover, the second pulley 80B is held freely rotatably around a rotation axis substantially parallel to the length direction thereof.

The first pulley 80A and the second pulley 80B are disposed at substantially the same height position (position in the Z-axis direction) in such a manner as to sandwich the traveling path of the laser beam 48 (optical axis of the optical system 64). Further, a region that is not wound around the first roller 76A or the second roller 76B in the protective film 72 is wound around the first pulley 80A and the second pulley 80B. Due to this, the protective film 72 is supported by the first pulley 80A and the second pulley 80B in such a manner as to cover the lower surface side of the laser processing head 46 in the state of being stretched between the first pulley 80A and the second pulley 80B.

The laser beam 48 transmitted through the collecting lens 68 is transmitted through the protective film 72 and is applied to the workpiece 11. As a result, laser processing is executed for the workpiece 11. Moreover, by the protective film 72 being disposed to cover the lower surface side of the laser processing head 46, foreign matters that are present on the lower side of the laser processing head 46 can be prevented from entering the inside of the laser processing head 46 and adhering to the collecting lens 68. For example, when the workpiece 11 is processed by the laser beam 48, the debris 21 that is molten substances of the workpiece 11 is scattered. The debris 21 scattered from the workpiece 11 to the side of the laser irradiation unit 44 is caught by the protective film 72 and does not adhere to the collecting lens 68.

However, when a large amount of debris 21 adheres to a region that overlaps with the collecting lens 68 in the protective film 72, irradiation of the workpiece 11 with the laser beam 48 is hindered in some cases. Thus, the protective film 72 is periodically sent out from the feed unit 74A to be taken up by the take-up unit 74B. Specifically, the control unit 54 (see FIG. 1) rotates the first roller 76A and the second roller 76B a predetermined number of times at a predetermined timing by outputting a control signal to the first rotational drive source 78A and the second rotational drive source 78B. As a result, a region to which the debris 21 adheres in the protective film 72 moves from the position that overlaps with the collecting lens 68, and a region to which the debris 21 is not adhered in the protective film 72 is newly positioned to the region that overlaps with the collecting lens 68. This makes the state in which the protective film 72 that covers the collecting lens 68 has been replaced.

The timing at which the protective film 72 is moved is not limited to any timing and can be set as appropriate according to the amount of generation of the debris 21 and so forth. For example, the protective film 72 may be moved every time a predetermined number of workpieces 11 (for example, one workpiece 11) are processed, or the protective film 72 may be moved every time the workpiece 11 is processed along a predetermined number of streets 13 (see FIG. 2). Further, it is also possible to move the protective film 72 while the workpiece 11 is irradiated with the laser beam 48. In this case, the processing of the workpiece 11 and the replacement of the protective film 72 are concurrently executed.

The protective film 72 also prevents adhesion of foreign matters other than the debris 21 to the collecting lens 68. For example, in some cases, a minute amount of particles or mist floats in the processing chamber in which processing of the workpiece 11 is executed. Entry of such foreign matters into the inside of the laser processing head 46 is also prevented by the protective film 72.

As above, on the laser irradiation unit 44 of the laser processing apparatus 2 according to the present embodiment, the foreign matter adhesion preventing unit 70 including the protective film 72 disposed between the holding surface 28a of the holding unit 28 and the collecting lens 68, the first roller 76A that sends out the protective film 72, and the second roller 76B that takes up the protective film 72 is mounted. Further, adhesion of a foreign matter to the collecting lens 68 is prevented by the protective film 72. In addition, the protective film 72 can easily be moved by the first roller 76A and the second roller 76B. Mounting the above-described foreign matter adhesion preventing unit 70 on the laser irradiation unit 44 makes it possible to easily and rapidly position the protective film 72 to which a foreign matter is not adhered to the position that overlaps with the collecting lens 68. As a result, suspension of processing of the workpiece 11 by the laser processing apparatus 2 for a long time due to foreign matter removal work can be avoided, and the operating efficiency of the laser processing apparatus 2 improves.

The protective film 72 may be in contact with the lower surface of the laser processing head 46 or may be held in the state of being separate from the lower surface of the laser processing head 46. When the protective film 72 is in contact with the lower surface of the laser processing head 46, foreign matters such as particles and mist that are present on the upper side of the protective film 72 can be prevented from entering the inside of the laser processing head 46 through a gap formed between the laser processing head 46 and the protective film 72 and adhering to the collecting lens 68. On the other hand, when the protective film 72 is not in contact with the lower surface of the laser processing head 46, the protective film 72 can be prevented from being damaged due to friction that acts between the laser processing head 46 and the protective film 72.

Further, although the case in which the collecting lens 68 of the laser irradiation unit 44 is disposed over the holding surface 28a of the holding unit 28 has been described in FIG. 3, the collecting lens 68 may be disposed under the holding surface of the holding unit. In this case, the protective film 72 is also disposed under the holding surface of the holding unit.

Figure 4:
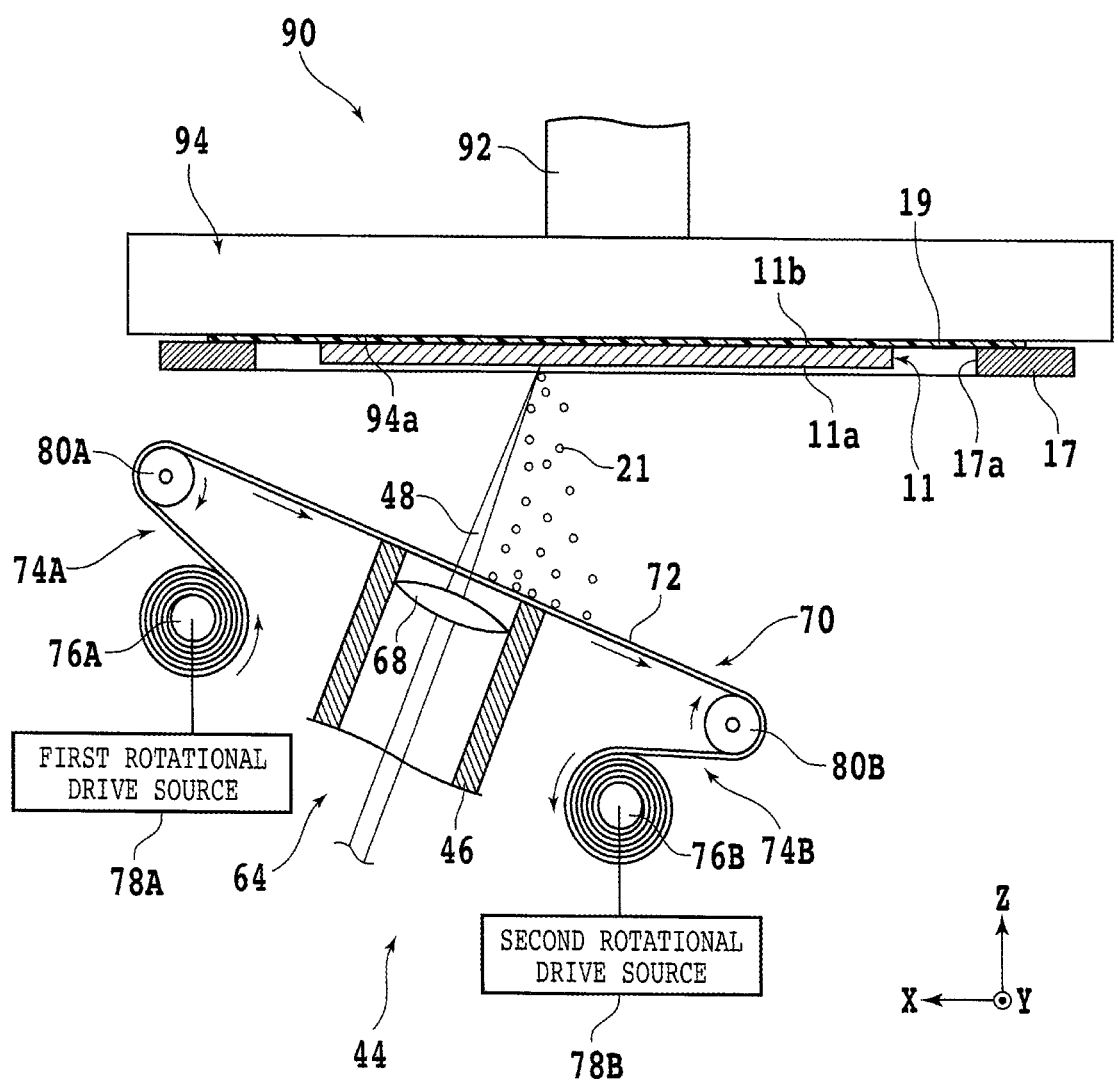
FIG. 4 is a partially sectional front view illustrating a holding unit (conveying unit) and the laser irradiation unit.

FIG. 4 is a partially sectional front view illustrating a holding unit (conveying unit) 90 and the laser irradiation unit 44. The laser processing apparatus 2 (see FIG. 1) may include the holding unit 90 that holds and conveys the workpiece 11, instead of the holding unit 28 or in addition to the holding unit 28.

The holding unit 90 includes a support shaft 92 with a circular column shape and a holding part 94 that is fixed to the tip part (lower end part) of the support shaft 92 and that has a circular disc shape. The lower surface of the holding part 94 is a flat surface substantially parallel to the horizontal direction (XY-plane direction) and configures a holding surface 94a that holds the workpiece 11. The holding surface 94a is connected to a suction source (not illustrated) such as an ejector through a flow path (not illustrated) formed inside the holding part 94, a valve (not illustrated), and so forth. For example, the holding unit 90 is first disposed to cause the holding surface 94a to get contact with the side of the back surface 11*b* of the workpiece 11 (side of the tape 19). When a suction force (negative pressure) of the suction source is caused to act on the holding surface 94*a* in this state, the workpiece 11 or the frame 17 is held under suction by the holding part 94 with the interposition of the tape 19.

The laser irradiation unit 44 is disposed under the holding unit 90. Further, the laser processing head 46 and the optical system 64 are disposed in such a manner that the upper surface side of the collecting lens 68 faces the holding surface 94*a* of the holding unit 90. Moreover, the protective film 72 is disposed to cover the upper surface side of the laser processing head 46. As illustrated in FIG. 4, the traveling path of the laser beam 48 (optical axis of the optical system 64) may incline with respect to the direction perpendicular to the holding surface 94*a*. In this case, the protective film 72 disposed between the holding surface 94*a* and the collecting lens 68 is also stretched to incline with respect to the holding surface 94*a*.

The holding unit 90 holds the workpiece 11 and positions it above the laser processing head 46. Then, the lower surface side of the workpiece 11 (side of the front surface 11*a*) is irradiated with the laser beam 48 from the laser irradiation unit 44, and laser processing is thereby executed for the side of the front surface 11*a* of the workpiece 11. At this time, the debris 21 generated in the region irradiated with the laser beam 48 in the workpiece 11 drops onto the side of the laser processing head 46. However, the debris 21 is caught by the protective film 72 and therefore does not adhere to the collecting lens 68.

When the collecting lens 68 is disposed under the holding surface 94*a* as described above, the debris 21 is liable to drop and be scattered to the side of the collecting lens 68. However, because the collecting lens 68 is covered by the protective film 72, adhesion of the debris 21 to the collecting lens 68 is prevented. Further, by moving the protective film 72 by the feed unit 74A and the take-up unit 74B, the protective film 72 to which the debris 21 is not adhered can easily and rapidly be positioned to the traveling path of the laser beam 48.

Besides, structures, methods, and so forth according to the above-described embodiment can be carried out with appropriate changes without departing from the range of the object of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus that processes a workpiece by irradiation with a laser beam, the laser processing apparatus comprising:
   a holding unit including a holding surface that holds the workpiece; and
   a laser irradiation unit that irradiates the workpiece held by the holding unit with the laser beam,
   wherein the laser irradiation unit includes:
      a laser oscillator,
      a collecting lens, located within a processing head, that focuses the laser beam emitted from the laser oscillator, and
      a foreign matter adhesion preventing unit that prevents adhesion of a foreign matter to the collecting lens, and
      the foreign matter adhesion preventing unit includes:
         a protective film that is disposed between the holding surface and the collecting lens and has transmissibility with respect to the laser beam,
         a first roller to which one end side of the protective film is fixed and that rotates to thereby send out the protective film,
         a second roller to which the other end side of the protective film is fixed and that rotates to thereby take up the protective film,
         a first pulley having a first rotation axis, and
         a second pulley having a second rotation axis,
      wherein the protective film is configured to pass from the first roller, to the first pulley, to the second pulley and then to the second roller, and
      further wherein the first rotation axis of the first pulley and the second rotation axis of the second pulley are both at an elevation that is higher than a lowermost surface of the processing head.

2. The laser processing apparatus according to claim 1, wherein the protective film is a polyolefin-based film or a polyester-based film.

3. A laser processing apparatus that processes a workpiece by irradiation with a laser beam, the laser processing apparatus comprising:
   a holding unit including a holding surface that holds the workpiece; and
   a laser irradiation unit that irradiates the workpiece held by the holding unit with the laser beam,
   wherein the laser irradiation unit includes:
      a laser oscillator,
      a collecting lens that focuses the laser beam emitted from the laser oscillator, and
      a foreign matter adhesion preventing unit that prevents adhesion of a foreign matter to the collecting lens, and
      the foreign matter adhesion preventing unit includes:
         a protective film that is disposed between the holding surface and the collecting lens and has transmissibility with respect to the laser beam,
         a first roller to which one end side of the protective film is fixed and that rotates to thereby send out the protective film, and
         a second roller to which the other end side of the protective film is fixed and that rotates to thereby take up the protective film,
      wherein the collecting lens is disposed under the holding surface,
      wherein a path of the laser beam is inclined with respect to the holding surface of the holding unit, and
      further wherein a plane defined by the protective film passing between the first and second rollers, at a position between the holding surface and the collecting lens, is also inclined with respect to the holding surface of the holding unit.

4. The laser processing apparatus according to claim 3, wherein the first roller is at an elevation higher than the second roller.

5. The laser processing apparatus according to claim 3, wherein the protective film is a polyolefin-based film or a polyester-based film.

6. The laser processing apparatus according to claim 3, further comprising:
   a first pulley having a first rotation axis, and
   a second pulley having a second rotation axis,
   wherein the protective film is configured to pass from the first roller, to the first pulley, to the second pulley and then to the second roller, and further wherein the plane defined by the protective film is formed by the portion of the protective film that passes from the first pulley to the second pulley.

7. A laser processing apparatus that processes a workpiece by irradiation with a laser beam, the laser processing apparatus comprising:
- a holding unit including a holding surface that holds the workpiece; and
- a laser irradiation unit that irradiates the workpiece held by the holding unit with the laser beam,
- wherein the laser irradiation unit includes:
  - a laser oscillator,
  - a collecting lens, located within a processing head, that focuses the laser beam emitted from the laser oscillator, and
  - a foreign matter adhesion preventing unit that prevents adhesion of a foreign matter to the collecting lens, and
  - the foreign matter adhesion preventing unit includes:
    - a protective film that is disposed between the holding surface and the collecting lens and has transmissibility with respect to the laser beam,
    - a first roller to which one end side of the protective film is fixed and that rotates to thereby send out the protective film, and
    - a second roller to which the other end side of the protective film is fixed and that rotates to thereby take up the protective film,
  - wherein the protective film contacts a lower surface of the processing head when passing between the first roller and the second roller.

8. The laser processing apparatus according to claim 7, wherein the protective film is a polyolefin-based film or a polyester-based film.

9. The laser processing apparatus according to claim 7, further comprising:
- a first pulley having a first rotation axis, and
- a second pulley having a second rotation axis,
- wherein the protective film is configured to pass from the first roller, to the first pulley, to the second pulley and then to the second roller, and
- further wherein the protective film contacts the lower surface of the processing head when passing between the first pulley and the second pulley.

* * * * *